(12) United States Patent
Hassell (10) Patent No.: US 11,173,939 B2
(45) Date of Patent: Nov. 16, 2021

(54) BAKERY DOLLY

(71) Applicant: Rehrig Pacific Company, Los Angeles, CA (US)

(72) Inventor: Jon P. Hassell, Atlanta, GA (US)

(73) Assignee: Rehrig Pacific Company, Los Angeles, CA (US)

( * ) Notice: Subject to any disclaimer, the term of this patent is extended or adjusted under 35 U.S.C. 154(b) by 27 days.

(21) Appl. No.: 16/545,760

(22) Filed: Aug. 20, 2019

(65) Prior Publication Data

US 2020/0055534 A1 Feb. 20, 2020

Related U.S. Application Data

(60) Provisional application No. 62/719,820, filed on Aug. 20, 2018.

(51) Int. Cl.
*B62B 5/00* (2006.01)
*B62B 3/16* (2006.01)
*B62B 3/00* (2006.01)
*B65D 1/34* (2006.01)

(52) U.S. Cl.
CPC ............ *B62B 5/0093* (2013.01); *B62B 3/006* (2013.01); *B62B 3/16* (2013.01); *B62B 2202/12* (2013.01); *B65D 1/34* (2013.01)

(58) Field of Classification Search
CPC ......... B62B 5/0093; B62B 3/006; B62B 3/16; B62B 3/00
See application file for complete search history.

(56) References Cited

U.S. PATENT DOCUMENTS

| | | |
|---|---|---|
| 1,184,079 A | 5/1916 | D'Arcy |
| 1,189,053 A | 6/1916 | Buchanan |
| 1,668,379 A | 5/1928 | Radvanyi |
| 1,777,694 A | 10/1930 | Halteman |
| 2,414,277 A | 1/1947 | Shepard, Jr. et al. |
| 2,470,054 A * | 5/1949 | Schildmeier .......... B60B 29/002 414/430 |
| 2,472,952 A | 6/1949 | Lennard |
| 2,610,750 A | 9/1952 | Hulbert |
| 2,876,020 A | 3/1959 | Murchie |
| 2,916,293 A | 12/1959 | Lang |
| 3,047,305 A | 7/1962 | Kleinschmidt |
| 3,154,316 A | 10/1964 | Gohmann |
| 3,172,374 A * | 3/1965 | Allen ................. B65D 19/0051 108/57.29 |
| 3,208,768 A | 9/1965 | Hulbert |

(Continued)

FOREIGN PATENT DOCUMENTS

| | | |
|---|---|---|
| DE | 2426549 A1 | 12/1974 |
| DE | 3316896 A1 | 11/1984 |

(Continued)

*Primary Examiner* — James A Shriver, II
*Assistant Examiner* — James J Triggs
(74) *Attorney, Agent, or Firm* — Carlson, Gaskey & Olds, P.C.

(57) ABSTRACT

A dolly includes a deck having a support area. A plurality of wheels support the deck. A peripheral lip projects upward relative to the support area of the deck and extends at least partially about a periphery of the deck. The peripheral lip includes a ramped portion. A stack of bakery trays can be tipped and slid onto the dolly over the ramped portion of the peripheral lip.

20 Claims, 12 Drawing Sheets

(56) References Cited

U.S. PATENT DOCUMENTS

| | | |
|---|---|---|
| 3,366,396 A | 1/1968 | Hardy |
| 3,372,829 A | 3/1968 | Averill |
| 3,582,102 A | 6/1971 | Bewick et al. |
| 3,735,882 A | 5/1973 | Reznicek |
| 3,834,865 A | 9/1974 | Lee |
| 3,890,890 A | 6/1975 | Hennells |
| 3,937,327 A | 2/1976 | Carroll |
| 3,964,762 A | 6/1976 | Adams |
| 4,077,644 A | 3/1978 | Roby et al. |
| 4,171,828 A | 10/1979 | Goodwin et al. |
| 4,298,127 A | 11/1981 | Upshaw et al. |
| 4,557,201 A | 12/1985 | Webb, Jr. |
| 4,720,115 A | 1/1988 | Rehrig |
| 4,796,909 A | 1/1989 | Kirkendall |
| 4,822,066 A | 4/1989 | Rehrig |
| 4,824,129 A | 4/1989 | Rehrig |
| 4,921,264 A | 5/1990 | Duffy |
| 5,372,257 A | 12/1994 | Beauchamp et al. |
| 5,427,394 A | 6/1995 | Lauto |
| 5,445,396 A | 8/1995 | Sebor |
| 5,599,031 A | 2/1997 | Hodges |
| 5,695,205 A | 12/1997 | Liu |
| 5,704,625 A | 1/1998 | Presnell et al. |
| 5,711,540 A | 1/1998 | Nesting |
| 5,718,441 A | 2/1998 | Kern et al. |
| 5,785,328 A | 7/1998 | Eckloff |
| 5,823,549 A | 10/1998 | Morgan, Jr. |
| 5,876,173 A | 3/1999 | English, Jr. |
| 5,906,384 A | 5/1999 | Nelson |
| 5,921,566 A | 7/1999 | Kern et al. |
| 6,105,980 A | 8/2000 | Cino et al. |
| D437,669 S | 2/2001 | Blason et al. |
| 6,193,247 B1 | 2/2001 | Spear et al. |
| 6,257,152 B1 | 7/2001 | Liu |
| D446,939 S | 8/2001 | Koefelda |
| 6,349,951 B1 | 2/2002 | Mogensen et al. |
| D456,972 S | 5/2002 | Blason et al. |
| 6,386,807 B1 | 5/2002 | Rowland |
| 6,402,167 B1 | 6/2002 | Calleja |
| 6,550,794 B1 | 4/2003 | Spindel et al. |
| 6,607,199 B2 | 8/2003 | Gruber |
| 6,857,642 B2 | 2/2005 | Gruber |
| 6,866,463 B2 | 3/2005 | Riordan et al. |
| 6,880,837 B2 | 4/2005 | Nandram et al. |
| 6,886,787 B2 * | 5/2005 | Stahl .................... B62B 3/1476 206/508 |
| 6,893,032 B2 | 5/2005 | Kershaw |
| 6,979,005 B1 | 12/2005 | McLerran |
| 7,059,617 B1 | 6/2006 | Verna |
| 7,066,477 B2 | 6/2006 | Dubois et al. |
| 7,097,182 B1 | 8/2006 | Liu |
| 7,097,406 B1 | 8/2006 | Gang |
| 7,104,553 B2 | 9/2006 | Gruber |
| 7,207,577 B2 | 4/2007 | Udall et al. |
| 7,281,720 B1 | 10/2007 | Richards |
| 7,350,789 B2 | 4/2008 | Uffner et al. |
| 7,484,621 B2 | 2/2009 | Apps et al. |
| D598,684 S | 8/2009 | Stahl |
| 7,686,167 B1 | 3/2010 | Stahl |
| 8,317,204 B2 | 11/2012 | Meers et al. |
| 8,740,228 B2 * | 6/2014 | Patterson ............... B62B 5/0093 280/33.998 |
| 9,061,693 B2 | 6/2015 | Hassell |
| 9,156,588 B2 | 10/2015 | Hassell |
| 10,322,849 B2 | 6/2019 | Hassell |
| 2002/0153682 A1 | 10/2002 | Gruber |
| 2003/0205877 A1 | 11/2003 | Verna et al. |
| 2003/0213878 A1 | 11/2003 | Stahl |
| 2004/0050742 A1 | 3/2004 | Gruber |
| 2004/0195803 A1 | 10/2004 | Brown |
| 2005/0006861 A1 | 1/2005 | Dubois et al. |
| 2006/0290087 A1 | 12/2006 | Visser |
| 2007/0187276 A1 | 8/2007 | Stahl |
| 2008/0111329 A1 | 5/2008 | Brown et al. |
| 2008/0296183 A1 | 12/2008 | Meers |
| 2009/0085315 A1 | 4/2009 | Meers et al. |
| 2015/0259077 A1 * | 9/2015 | Wiskus ................... B60B 30/02 414/430 |

FOREIGN PATENT DOCUMENTS

| | | |
|---|---|---|
| DE | 19649982 C1 | 6/1998 |
| EP | 1125818 B1 | 8/2001 |
| EP | 1149753 A2 | 10/2001 |
| FR | 381259 A | 5/1930 |
| FR | 1485314 A | 6/1967 |
| GB | 2207894 A | 2/1989 |
| GB | 2263684 A | 8/1993 |
| GB | 2353012 A | 2/2001 |
| GB | 2377689 A | 1/2003 |
| JP | 6206545 B1 | 10/2017 |

* cited by examiner

BAKERY DOLLY

CROSS-REFERENCED TO RELATED APPLICATION

This application claims priority to U.S. Provisional Application No. 62/719,820, which was filed on Aug. 20, 2018.

BACKGROUND

A dolly for bakery trays typically includes a deck supported by casters. A stack of bakery trays can be supported on the dolly for moving the bakery trays.

Some types of bakery trays include a base with side walls and front and rear walls extending upwardly from a periphery of the base. The front and rear walls are shorter than the side walls. Stacking feet protrude outwardly from the side walls. The stacking feet may provide multiple stacking heights for the trays when they are stacked in different relative orientations.

SUMMARY

A dolly includes a deck having a support area. A plurality of wheels support the deck. A peripheral lip projects upward relative to the support area of the deck and extends at least partially about a periphery of the deck. The peripheral lip includes a ramped portion. A stack of bakery trays can be tipped and slid onto the dolly over the ramped portion of the peripheral lip.

DETAILED DESCRIPTION

FIGS. 1-6 show a dolly 210 according to a first embodiment. The dolly 210 includes a deck having a central support surface 212 circumscribing a central opening 214. The deck includes a plurality of reinforcement channels including end reinforcement channels 216 (which could have ribs extending therethrough) and side reinforcement channels 218 (which could have transverse ribs extending therethrough). The central support surface 212 of the deck further includes outer side reinforcement channels 220 (again, shown without ribs, but which could have ribs extending therethrough). Each end of the dolly 210 includes a recessed area 222 outward of the central support surface 212. Reinforcement channels 224 are formed in the recessed areas 222 and could optionally include perpendicular ribs (not shown) therethrough. In this example, the deck of the dolly 210 has side edges that are longer than the end edges, which is preferred; however, it is possible that in some applications, the end edges could be longer.

Figure 1:
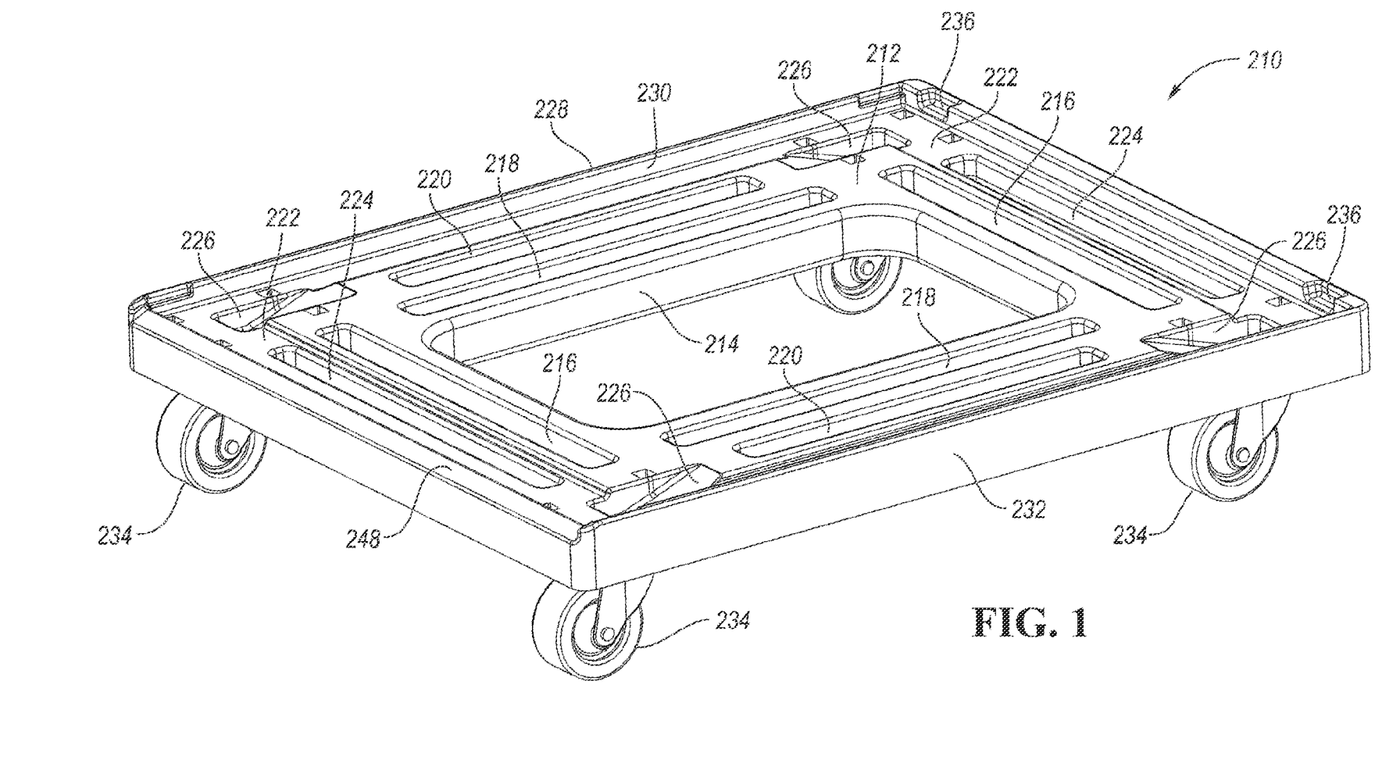
FIG. 1 is a perspective view of a dolly according to a first embodiment.

Caster-receiving pockets 226 are formed adjacent corners of the dolly 210 through the central support surface 212 and recessed areas 222. The caster-receiving pockets 226 are aligned with casters 234 extending downward from an under side of the dolly 210.

A peripheral lip 228 extends around the periphery of the dolly 210. The peripheral lip 228 may include an inner wall portion 230 spaced inwardly from an outer wall portion 232. The inner wall portion 230 and the outer wall portion 232 are joined continuously at an upper edge thereof. The double-walled peripheral lip 228 provides increased strength and durability to the dolly 210. The double-walled peripheral lip 228 provides increased stiffness to the deck. Recesses 236 are formed in one end portion of the peripheral lip 228. The recesses 236 in this embodiment are formed through the inner wall portion 230 of the peripheral lip 228 but not through the outer wall portion 232 of the peripheral lip 228, but could optionally extend all the way through the peripheral lip 228.

The opposite end of the peripheral lip 228 includes a ramped portion 248 of reduced height relative to the rest of the peripheral lip 228 but still higher than the adjacent recessed area 222. The ramped portion 248 includes a vertical shoulder portion facing the recessed area 222. The ramped portion 248 is lower than the adjacent side portions of the peripheral lip 228, which form guide members at either side of the ramped portion 248. The ramped portion 248 angles down outward of the deck. The ramped portion 248 may be considered a chamfered portion of the peripheral lip 228.

Figure 2:
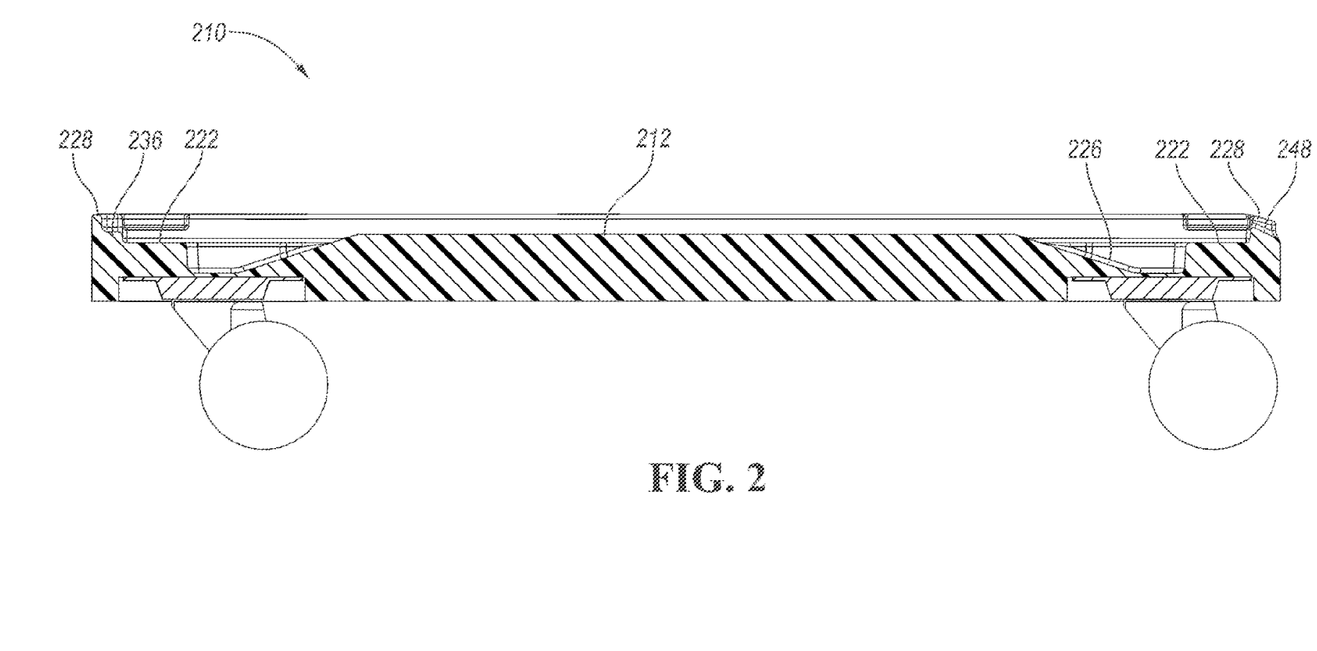
FIG. 2 is a section view through the dolly of FIG. 1, taken through the recesses and caster-receiving pockets.

FIG. 2 is a section view through the dolly 210, taken through the recesses 236 and caster-receiving pockets 226. FIG. 2 shows the relative heights of the different surfaces. The peripheral lip 228 is the uppermost surface of the dolly 210. The uppermost (and innermost) edge of the ramped portion 248 is slightly lower than the uppermost surface of the peripheral lip 228. The bottom of each of the recesses 236 is slightly higher than or coplanar with the central support surface 212. The central support surface 212 is slightly lower than the uppermost, innermost edge of the ramped portion 248 and slightly higher than the leading edge of the ramped portion 248. The recessed areas 222 of the deck are lower than the central support surface 212. The bottoms of the caster-receiving pockets 226 are the lowest surfaces on the upper surface of the dolly 210.

Figure 3:
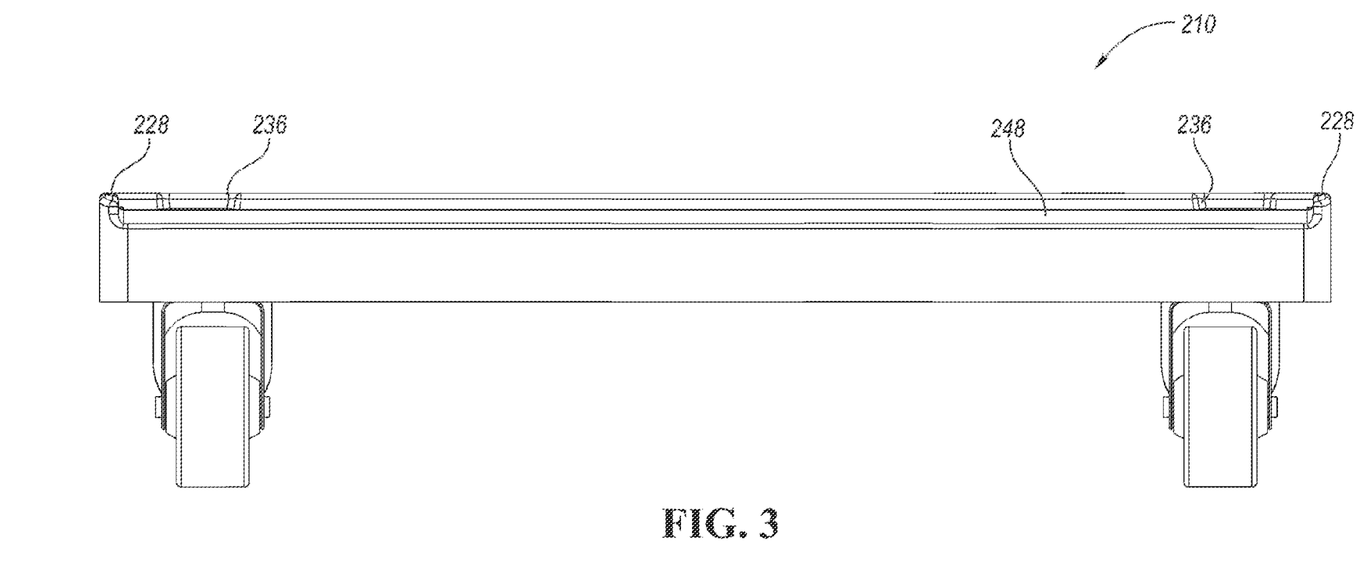
FIG. 3 is an end view of the dolly of FIG. 1.
Figure 4:
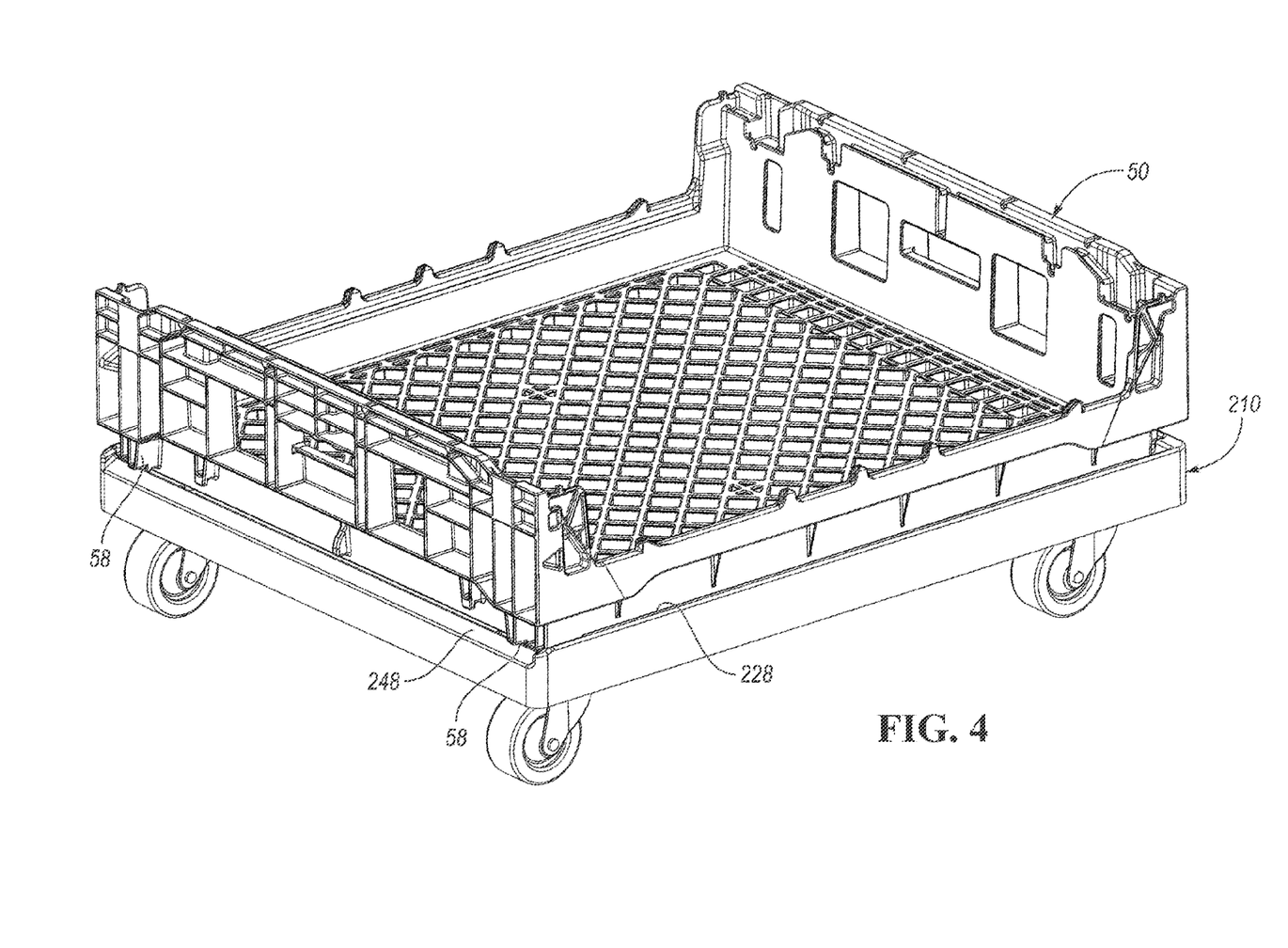
FIG. 4 shows a tray stacked on the dolly of FIG. 1.

FIG. 3 is an end view of the dolly 210. FIG. 4 shows a tray 50 stacked on the dolly 210. Generally, a stack of a plurality of trays 50 would be stacked on the dolly 210, but only the bottom tray 50 is shown for illustration.

In use, the user can tip a stack of trays 50 while pushing the dolly 210 toward the stack of trays 50 with their foot, so that the ramped portion 248 of the dolly 210 contacts the tipped bottom tray 50. The user can then slide the stack of trays 50 up the ramped surface 248 of the dolly 210, with the projecting side portions of the peripheral lip 228 at either side of the ramped surface 248 guiding the bottom tray 50 onto the deck of the dolly 210.

Figure 5:
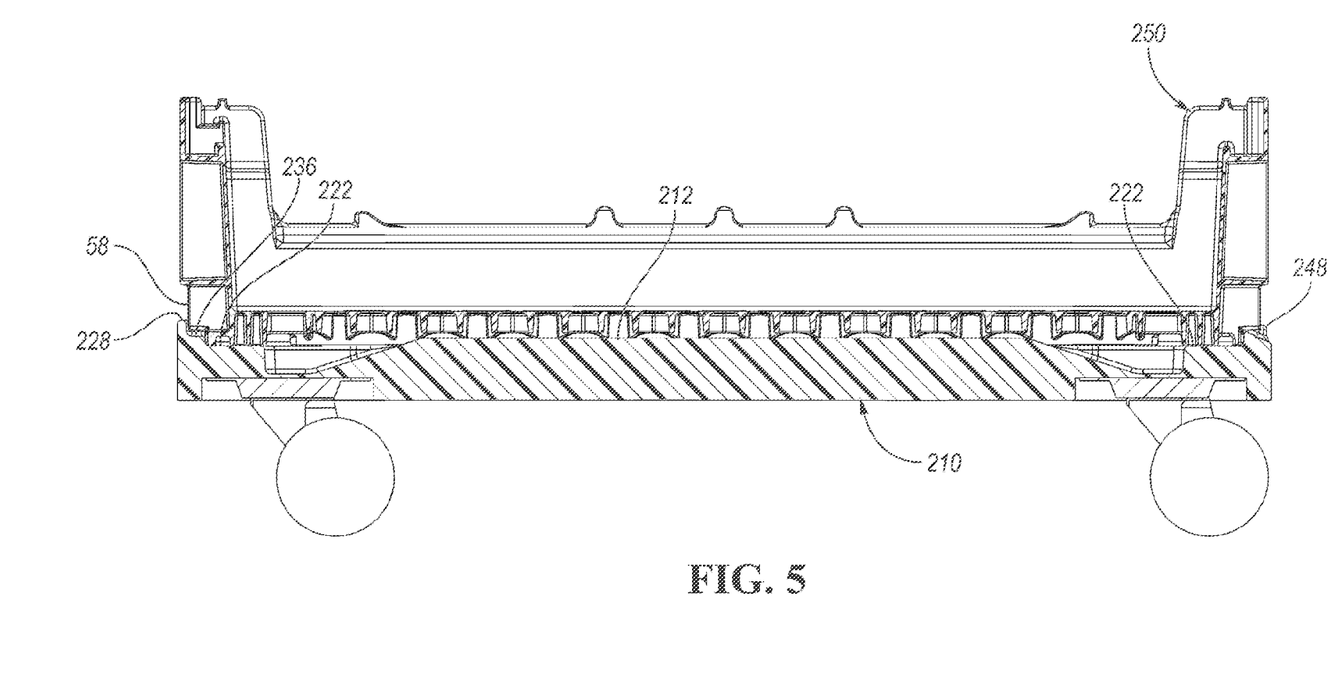
FIG. 5 shows the section view of FIG. 2 with the tray stacked thereon.
Figure 6:
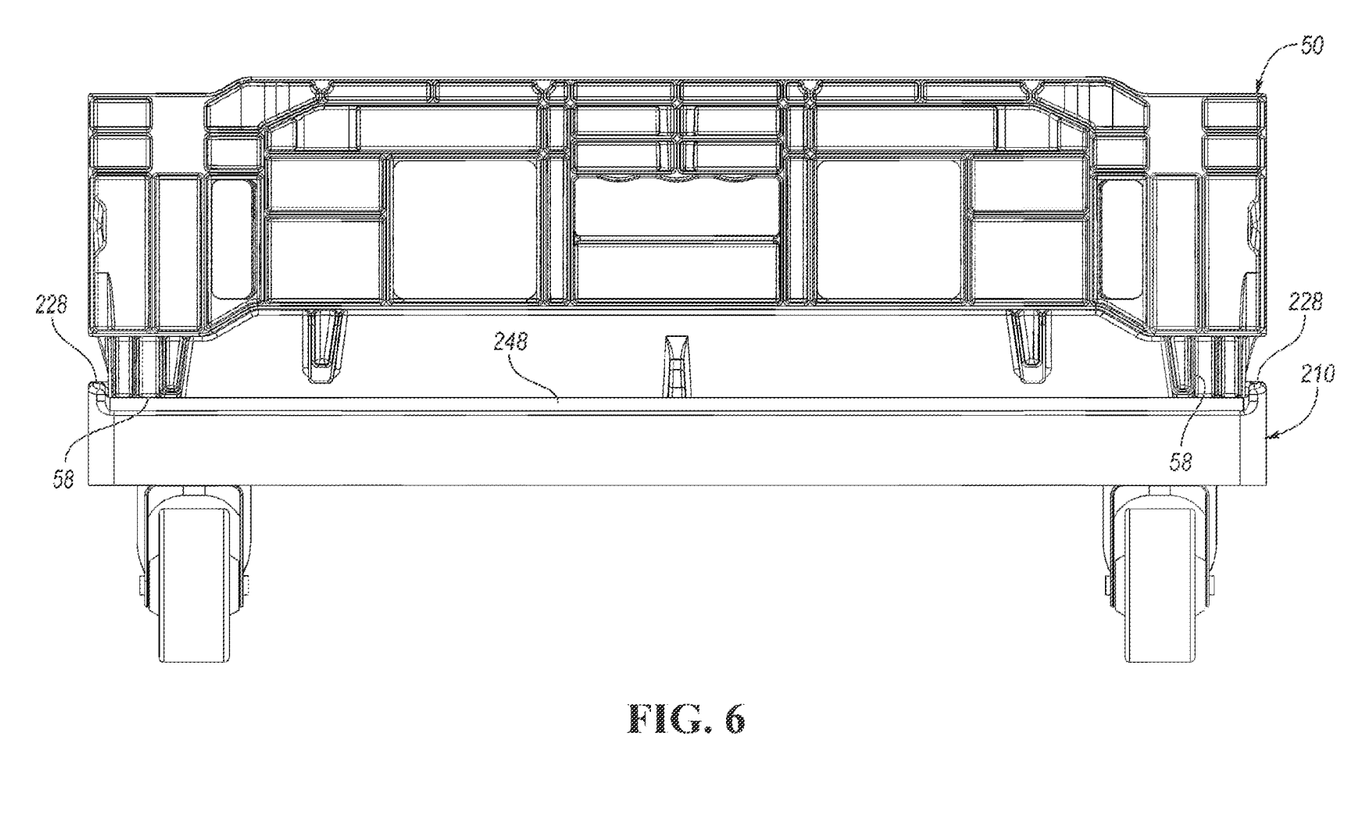
FIG. 6 is an end view of the tray and dolly of FIG. 4.

As shown in FIGS. 5 and 6, the bottom tray 50 interlocks with the deck of the dolly 210. The feet 58 are received in the recesses 236 in the peripheral lip 228 of the dolly 210, which help align the bottom tray 50 on the dolly 210. The tray 50 is received between the sides and ends of the peripheral lip 228.

Figure 7:
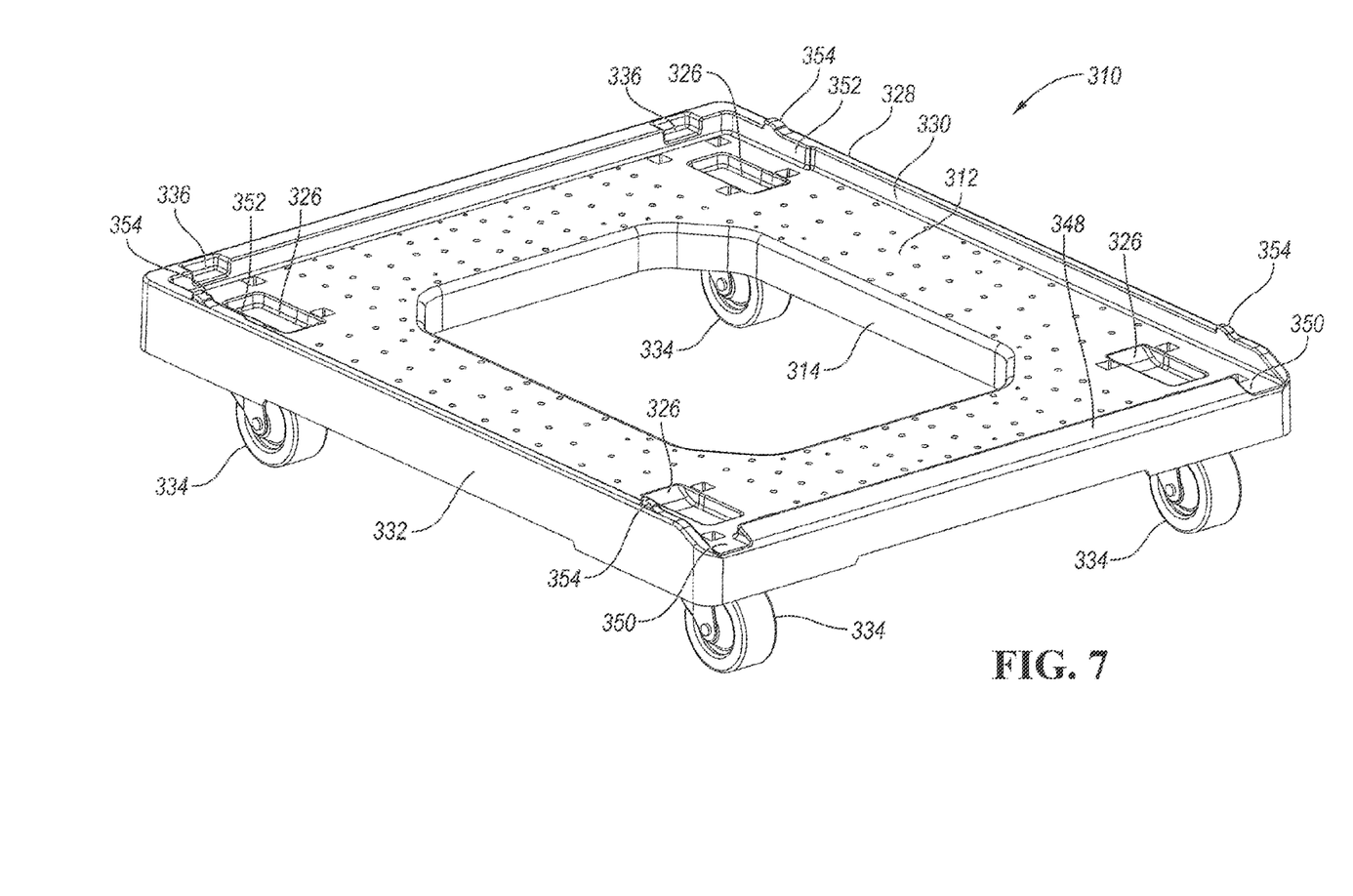
FIG. 7 is a perspective view of a dolly according to a second embodiment.

FIG. 7 shows a dolly 310 according to a second embodiment. The dolly 310 includes a deck having a central support surface 312 circumscribing a central opening 314. In this embodiment, the central support surface 312 is generally planar other than caster-receiving pockets 326. In this example as well, the deck of the dolly 310 has side edges that are longer than the end edges, which is preferred; however, it is possible that in some applications, the end edges could be longer.

Caster-receiving pockets 326 are formed adjacent corners of the dolly 310 through the central support surface 312. The caster-receiving pockets 326 are aligned with casters 334 extending downward from an under side of the dolly 310.

A peripheral lip 328 extends around the periphery of the dolly 310. The peripheral lip 328 may include an inner wall portion 330 spaced inwardly from an outer wall portion 332. The inner wall portion 330 and the outer wall portion 332 are joined continuously at an upper edge thereof. The double-walled peripheral lip 328 provides increased strength and durability to the dolly 310. The double-walled peripheral lip 328 provides increased stiffness to the deck. Recesses 336 are formed in a first end portion of the peripheral lip 328. The recesses 336 are formed through the inner wall portion 330 of the peripheral lip 328 but not through the outer wall portion 332 of the peripheral lip 328, but could optionally extend all the way through the peripheral lip 328.

The opposite, second end portion of the peripheral lip 328 includes a ramped portion 348 (or it may be considered a chamfered portion of the peripheral lip 328) of reduced height relative to the rest of the peripheral lip 328. The ramped portion 348 is lower than the adjacent side portions of the peripheral lip 328, which form guide members at either side of the ramped portion 348. The ramped portion 348 angles down outward of the deck and includes a vertical shoulder portion facing inward of the deck (e.g. facing toward the first end portion of the peripheral lip 328). The ramped portion 348 promotes the sliding of tray stacks onto the dolly deck. The vertical shoulder portion retains the tray stack on the dolly 310. Notches 350 are formed in the ramped portion 348 adjacent each long edge to allow for the drag rail on the base of the tray to slide in the notches 350 on the top deck of the dolly 310. The upper surfaces of the side portions of the peripheral lip 328 are tapered downward toward the second end portion of the dolly 310.

The opposite side portions of the peripheral lip 328 are generally perpendicular to the end portions of the peripheral lip 328. The side portions of the peripheral lip 328 include stepped portions 352 projecting inward toward one another adjacent the first end portion of the peripheral lip 328 to reduce the distance between inner surfaces of the side portions of the peripheral lip 328. This provides a tighter fit with the tray stacked on the dolly 310. Each side portion includes a pair of interlocking members 354 projecting upward from the peripheral lip 328. Each interlocking member 354 has a ramped surface facing the second end of the dolly 310 and vertical shoulder facing the first end of the dolly 310.

Figure 8:
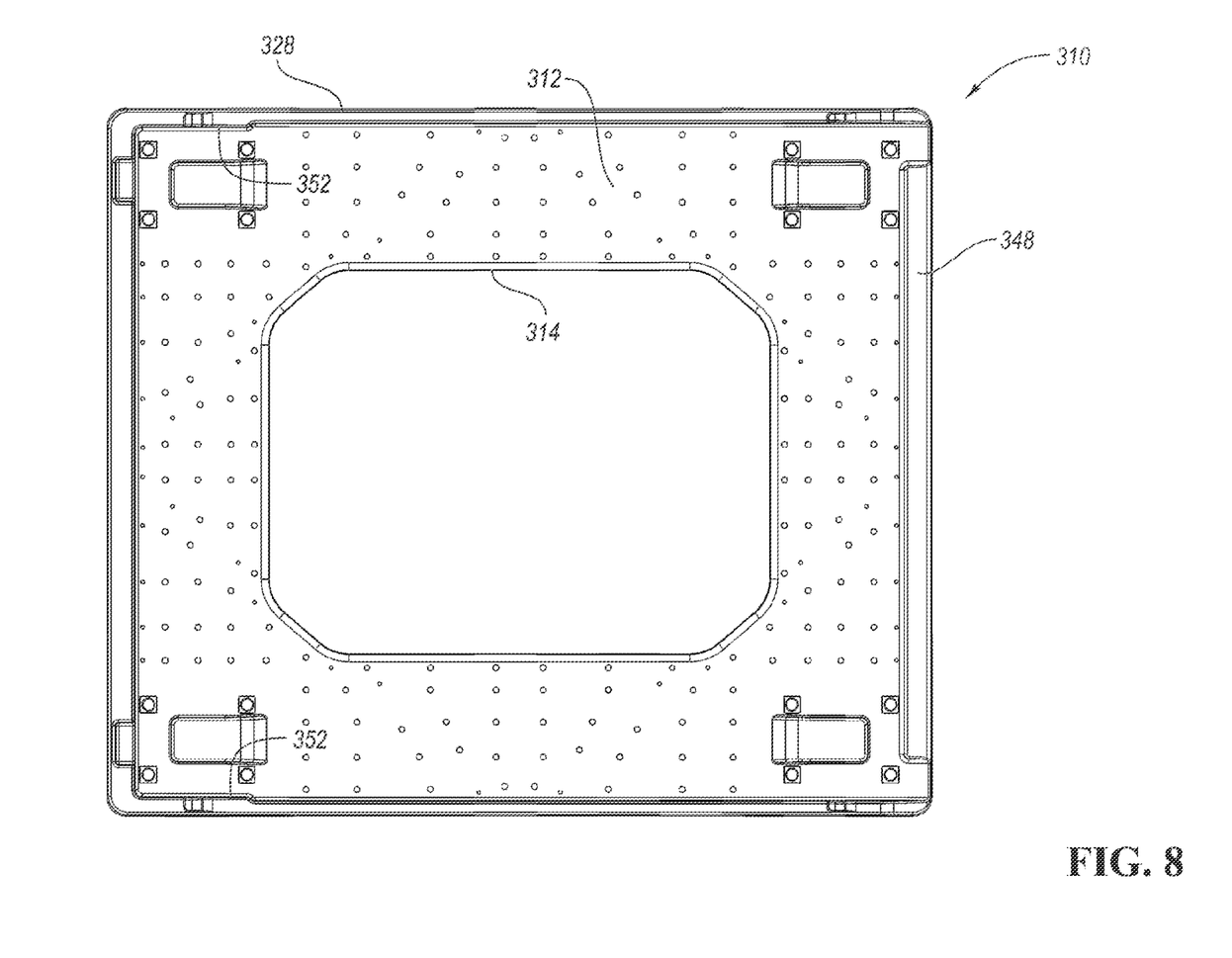
FIG. 8 is a top view of the dolly of FIG. 7.
Figure 9:
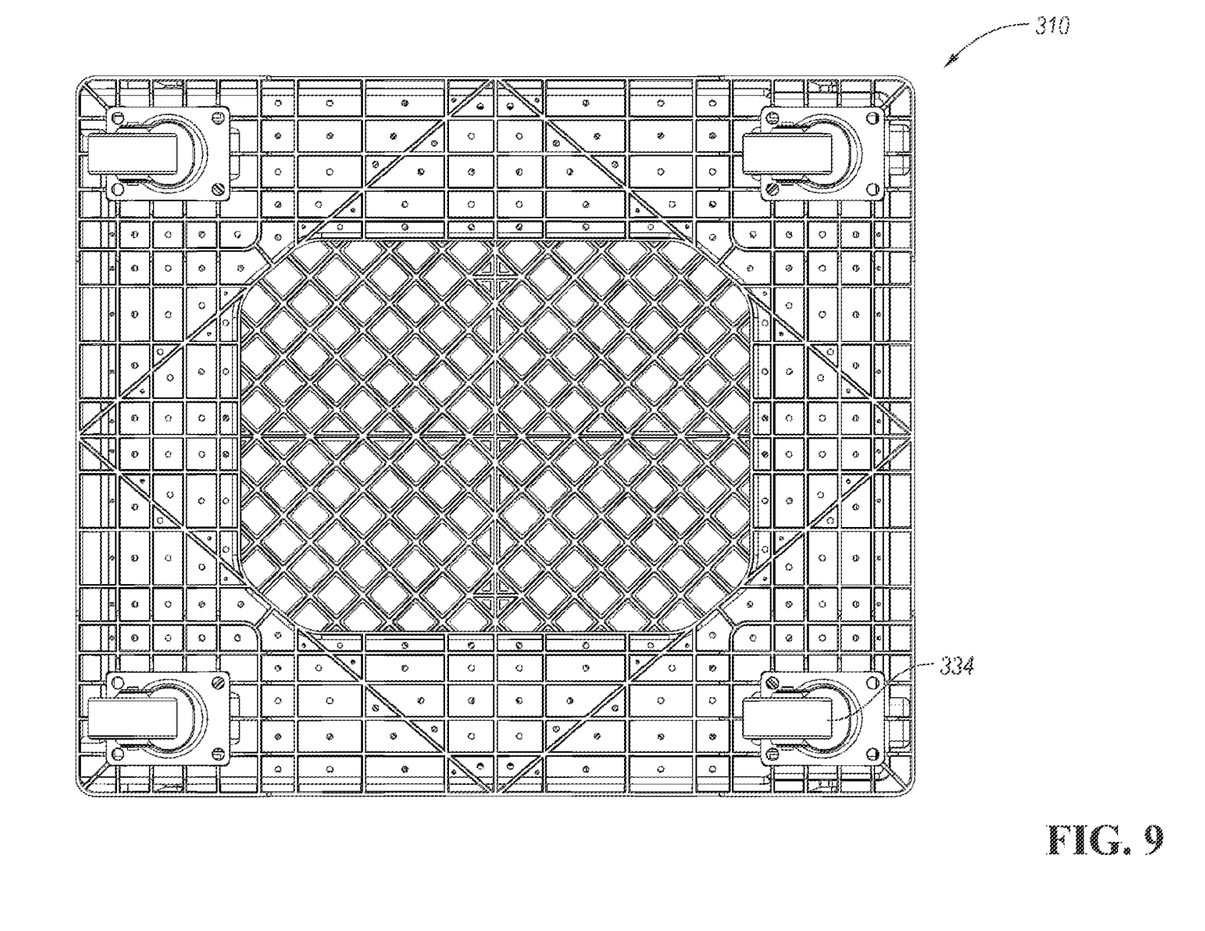
FIG. 9 is a bottom view of the dolly of FIG. 7.
Figure 10:
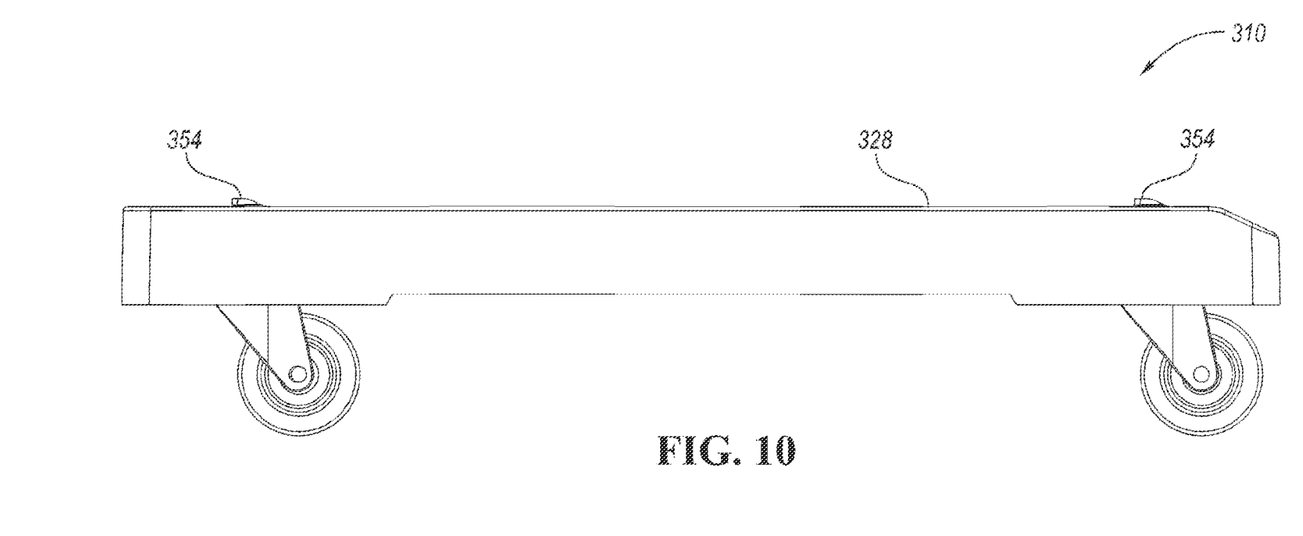
FIG. 10 is a side view of the dolly of FIG. 7.
Figure 11:
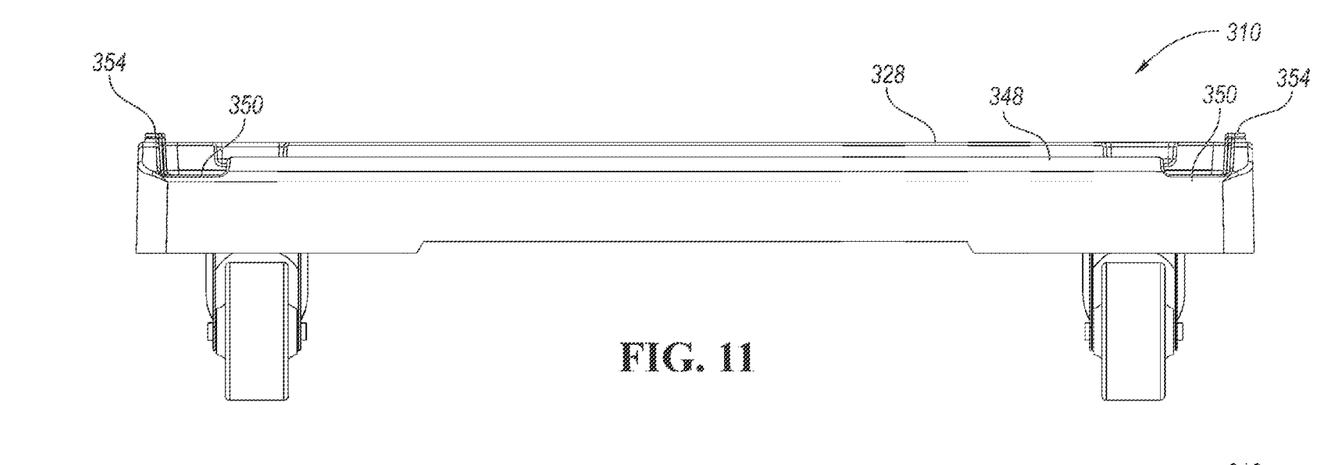
FIG. 11 is an end view of the dolly of FIG. 7.
Figure 12:
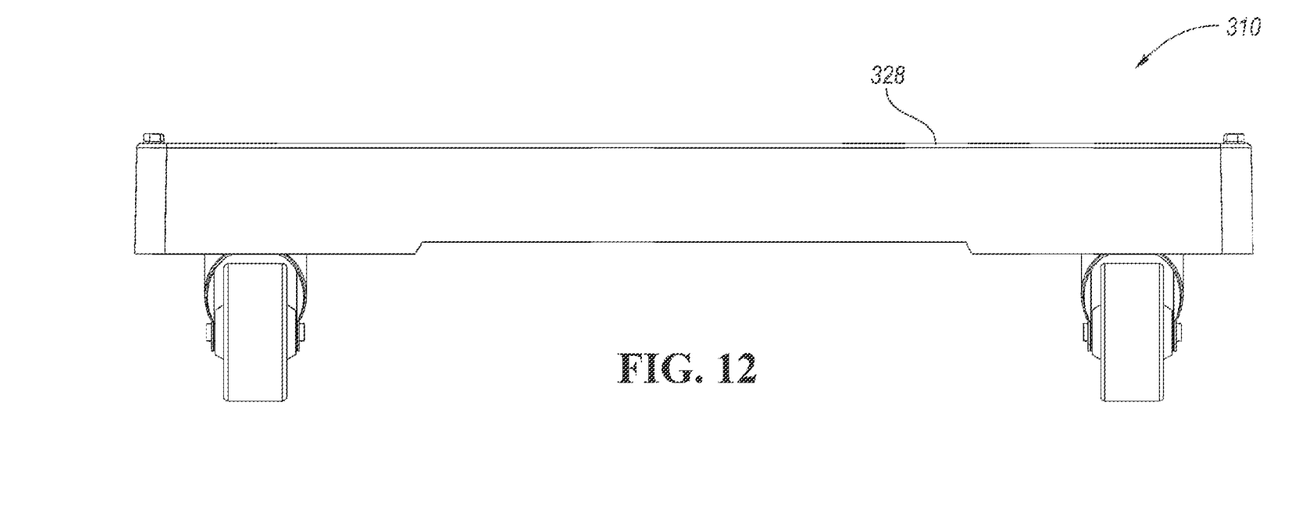
FIG. 12 is another end view of the dolly of FIG. 7.

FIG. 8 is a top view of the dolly 310. FIG. 9 is a bottom view of the dolly 310. FIG. 10 is a side view of the dolly 310. FIG. 11 shows a view of the second end of the dolly 310. FIG. 12 shows a view of the first end of the dolly 310.

Figure 13:
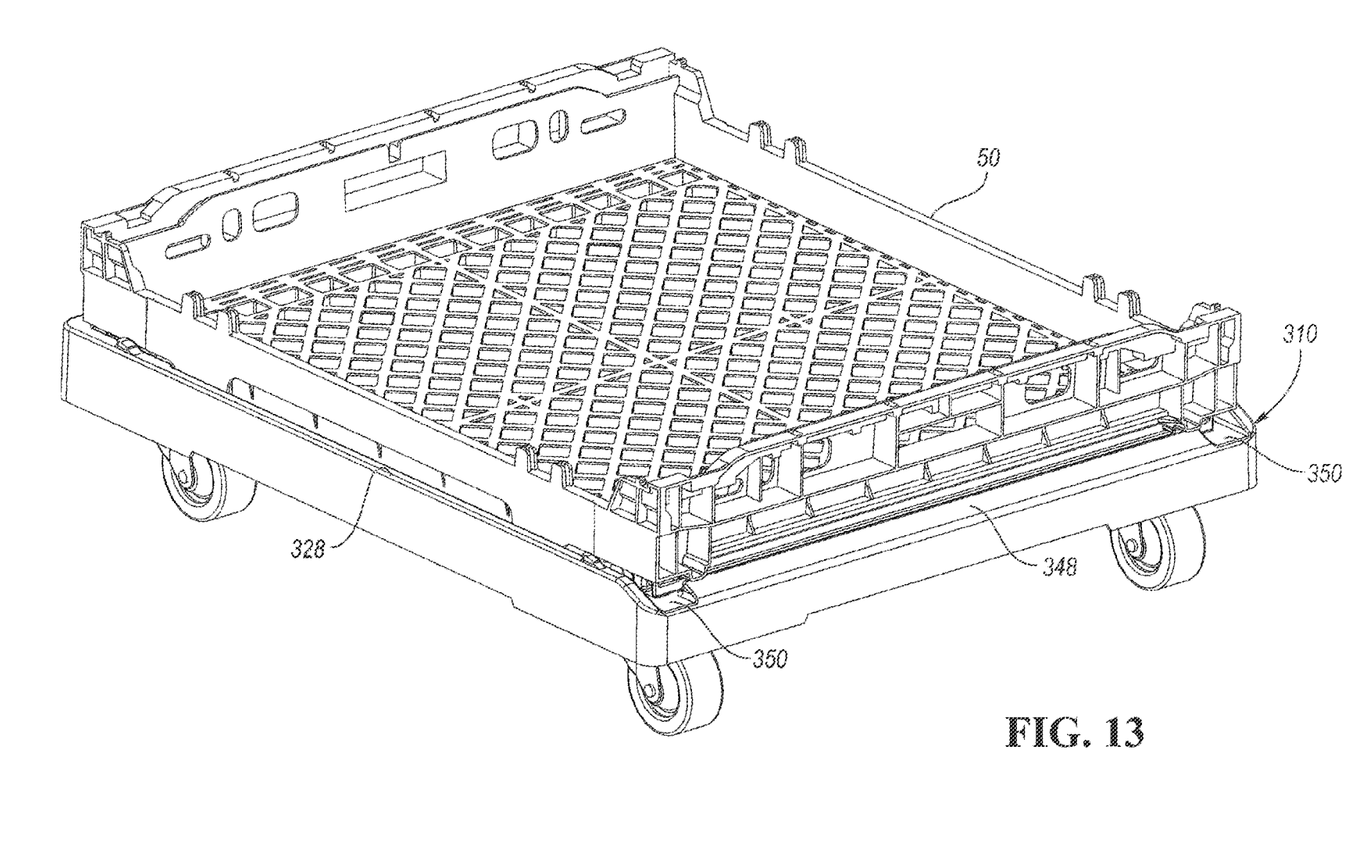
FIG. 13 shows a tray on the dolly of FIG. 7.

FIG. 13 shows a tray 50 stacked on the dolly 310. Generally, a stack of a plurality of trays 50 would be stacked on the dolly 310, but only the bottom tray 50 is shown. The base of the bottom tray 50 slides over the ramped portion 348 of the peripheral lip 328 with the drag rails passing through the notches 350. The base of the bottom tray 50 slides onto the central support surface 312 and is retained by the peripheral lip 328 on all sides.

In use, the user can tip a stack of trays 50 while pushing the dolly 310 toward the stack of trays 50 with their foot, so that the ramped portion 348 of the dolly 310 contacts the tipped bottom tray 50. The user can then slide the stack of trays 50 up the ramped surface 348 of the dolly 310, with the projecting side portions of the peripheral lip 328 at either side of the ramped surface 348 guiding the bottom tray 50 onto the deck of the dolly 310.

In both embodiments the deck is preferably injection molded as a single piece of plastic. Alternatively, the deck can be thermoformed and optionally can be reinforced with metal or composite reinforcement bars.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A dolly comprising:
   a deck having a support area;
   a plurality of wheels below the deck and supporting the deck; and
   a peripheral lip projecting upward relative to the support area of the deck and extending at least partially about a periphery of the deck, the peripheral lip including a ramped portion angled downward outward of the deck, the ramped portion including a shoulder facing inward of the deck.

2. The dolly of claim 1 wherein the dolly further includes notches between the ramped portion and the side portions of the peripheral lip.

3. The dolly of claim 1 wherein the deck includes opposed side edges and opposed end edges perpendicular to the side edges, wherein the ramped portion is formed on one of the end edges, and wherein the end edges are shorter than the side edges.

4. The dolly of claim 3 wherein the peripheral lip includes side portions extending upward at side edges of the deck, the opposed end edges including first and second end edges, wherein the ramped portion is formed on the second end edge, and wherein the peripheral lip extends upwards at the first end edge of the deck.

5. The dolly of claim 4 wherein the side portions of the peripheral lip each include a stepped portion projecting inward toward the other stepped portion, wherein the stepped portions are proximate the first end edge of the deck.

6. The dolly of claim 5 wherein the first end edge includes recesses for receiving feet of a tray to be stacked on the dolly.

7. The dolly of claim 6 further including interlocking portions projecting upward from the side portions of the peripheral lip.

8. The dolly of claim 7 wherein the interlocking portions each include a ramped portion facing the second end edge of the dolly and a shoulder facing the first end edge of the dolly.

9. The dolly of claim 1 further including reinforcement channels molded into the deck.

10. A dolly comprising:
    a deck having a support area, wherein the support area of the deck includes a central support area and recessed areas on either side of the central support area;
    a plurality of wheels below the deck and supporting the deck; and a peripheral lip projecting upward relative to the support area of the deck and extending at least partially about a periphery of the deck, the peripheral lip including a ramped portion.

11. The dolly of claim 1 further including a central opening through the deck.

12. A dolly comprising:
a deck having a central support area, the deck including first and second end edges and opposed side edges;
a plurality of wheels below the deck and supporting the deck; and
a peripheral lip projecting upward relative to the central support area of the deck, the peripheral lip including side portions extending upward from side edges of the deck, a pair of recesses formed in the peripheral lip along the first end edge of the deck, the peripheral lip including a chamfered portion along the second end edge of the deck.

13. The dolly of claim 12 wherein the chamfered portion of the peripheral lip angles downward outward of the deck and includes a shoulder facing inward of the deck.

14. The dolly of claim 13 further including notches between the chamfered portion and the side portions of the peripheral lip.

15. The dolly of claim 14 wherein the first and second end edges are shorter than the side edges.

16. The dolly of claim 12 wherein the side portions of the peripheral lip each include a stepped portion projecting inward toward the other stepped portion, wherein the stepped portions are proximate the first end edge of the deck.

17. The dolly of claim 12 in combination with a bakery tray stacked thereon, the bakery tray including feet received in the recesses in the peripheral lip.

18. A dolly comprising:
a deck having a support area, a plurality of caster-receiving pockets molded into the deck;
a plurality of wheels below the deck and supporting the deck, wherein the caster-receiving pockets are aligned with the plurality of wheels below the deck; and
a peripheral lip projecting upward relative to the support area of the deck and extending at least partially about a periphery of the deck, the peripheral lip including a ramped portion.

19. The dolly of claim 18 wherein the caster-receiving pockets open upward of the deck.

20. The dolly of claim 19 further including a pair of recesses formed in the peripheral lip along a first end edge of the deck.

* * * * *